United States Patent
Santillo, Jr.

[19]

[11] Patent Number: 5,891,493
[45] Date of Patent: Apr. 6, 1999

[54] PREDIGESTED SEED FOOD COMPOSITION

[76] Inventor: Humbart D. Santillo, Jr., 5010 Glenwood Dr., Williamsville, N.Y. 14221

[21] Appl. No.: 978,090

[22] Filed: Nov. 25, 1997

[51] Int. Cl.⁶ ..................................................... A23G 1/02
[52] U.S. Cl. ............................................... 426/44; 426/46
[58] Field of Search ......................................... 426/44, 46

[56] References Cited

U.S. PATENT DOCUMENTS

| | | | |
|---|---|---|---|
| 2,501,017 | 8/1950 | Schwarz | 426/44 |
| 2,960,408 | 11/1960 | Geister | 426/44 |
| 3,180,569 | 4/1965 | Toyama et al. | 426/44 |
| 4,333,955 | 6/1982 | Murata et al. | 426/44 |
| 4,483,874 | 11/1984 | Olsen | 426/44 |
| 4,563,356 | 1/1986 | Fujisawa et al. | 426/44 |
| 4,904,483 | 2/1990 | Christensen et al. | 426/44 |
| 5,266,473 | 11/1993 | Nielsen | 435/219 |
| 5,376,390 | 12/1994 | Hammond | 426/44 |

*Primary Examiner*—Nina Bhat
*Attorney, Agent, or Firm*—Harris Beach & Wilcox, LLP

[57] ABSTRACT

A seed food composition enzymatically predigested to be more readily digestible and utilizable by humans than the seed starting material from which it is derived. A quantity of seeds, either whole seeds or seeds having been modified from their raw, whole, natural state, as by drying, shelling or sprouting is macerated and comminuted. Water is added to form a slurry, and one or more plant-digestive enzymes are introduced. The slurry may be heated and pH may be adjusted and nutrient compounds introduced as required to enhance enzyme activity. When enzymatic predigestion has proceeded to a desired state, characterized by partial or complete conversion of all the enzyme substrate in the seed material or by a desired level of enzyme reaction products, the slurry preferably is dried to a powder and may be mixed subsequently with enzymes and other known materials or compounds to improve, for example, appearance, palatability, shelf life, or nutritive potential. A predigested seed food composition may be incorporated as a high-nutrition component in a wider range of edible end products, such as milkshakes or other drinks, baby foods, baked goods including breads, cookies, cereals, food bars, animal food supplements and the like. The dried, powdered form of the composition may be used as a flour substitute, nutritional enhancer, or extender in many recipes.

6 Claims, 1 Drawing Sheet

PREDIGESTED SEED FOOD COMPOSITION

DESCRIPTION

The present invention relates to concentrated food supplements, more particularly to food supplements derived from seeds, including nuts and grains, and most particularly to food supplements derived from seeds wherein the nutritive material has been at least partially digested enzymatically prior to ingestion by the user.

As used herein, the term "seed" means the fertilized, ripened ovule of a flowering plant containing an embryo and capable normally of germination to produce a new plant.

Nuts and grains are types of seeds widely used in human nutrition. Some well-known examples of nuts are peanuts, walnuts, coconuts, pine nuts, cashew nuts, hickory nuts, chestnuts, almonds, brazil nuts, and filberts. Some well-known examples of grains are wheat, corn, oats, rye, rice, and barley.

Other types of seeds, for example, sunflower, pumpkin, squash, poppy, sesame, flax, chia, celery, and caraway, as well as legumenous, seeds such as peas, beans, soybeans, and lentils, are also widely used in human nutrition.

Seeds are known to be excellent sources of complete plant proteins and fats which can be of significant nutritional value to, for example, athletes, children, elderly persons, and recovery patients in hospitals. However, seeds in their raw or native state can be difficult for humans to digest. In addition, as people age they tend to exhibit lower levels of seed-digesting enzymes in their digestive tracts.

After harvest, nuts typically are treated, for example by heat, to kill parasites which may be present on or in the nut.

Such treatment generally is insufficient to break down hard-to-digest compounds within the nuts. Grains typically are extremely difficult for the human digestive tract to decompose without first being at least partially predigested as by cooking with heat to break down proteins, carbohydrates, oils, fiber, or by sprouting. By "predigestion" is meant the process of making food more nutritionally absorbable by breaking it down into simpler chemical compounds prior to ingestion.

Many known predigestion processes typically involve extended exposure to high heat, such as baking, boiling, broiling, and frying, which can destroy much of the nutritive value of seeds. Many nutritive compounds contained in seeds, such as various vitamins, proteins, amino acids, fats, and oils, are susceptible to chemical and/or physical changes through heating or cooking. The application of heat to these compounds can result in creation of compounds lacking the desirable characteristics of the original compounds and can result in a substantial decrease in the concentration of components which are essential for human nutrition. For example, application of heat in excess of 120° F. for extended periods can destroy beneficial enzymes and many common vitamin compounds such as vitamins B, C, and E. In addition, many plant phytochemicals which may possess unique nutritional properties also can be denatured by application of heat; current techniques and methodologies used to recover these compounds from the native sources do not involve the application of heat.

Thus, there is a need for a method of predigesting seeds prior to animal consumption thereof, and especially human consumption, wherein high temperatures are not required, and whereby nutritive compounds are not destroyed or removed, and whereby otherwise indigestible nutritive compounds are converted to digestible compounds and are released for animal digestion.

It is a principal object of the invention to provide a process for at least partial predigestion of seeds.

It is a still further object of the invention to provide a process for making a seed food composition wherein predigestion of seeds is carried out by means of one or more enzymes.

It is a further object of the invention to provide an improved seed food composition wherein the seed material has been at least partially predigested by enzymes.

It is a further object of the invention to provide an improved seed food composition which has substantially greater nutritive value in terms of utilization by an animal user than the raw seed materials from which it is derived.

It is a further object of the invention to provide an improved seed food composition which can be more readily digested in the digestive tract of its user than can the raw seed materials from which it is derived.

Briefly described, in a method in accordance with the invention, a quantity of one or more types of seeds, e.g., seeds from one or a plurality of species of plants, either whole seeds or seeds having been husked, shelled, defatted, sprouted or otherwise modified in any way from their raw, whole, natural state (referred to herein as "processed seeds"), is macerated, crushed, and/or ground in preparation for processing. Water is added to form a slurry, and one or more plant-digestive enzymes and other compounds as may be required for enzyme activity are introduced. Enzymes are an improvement over cooking as an agent for predigestion because enzymes can mediate the desired chemical breakdowns and conversions typically at moderate temperatures, thus avoiding thermal decomposition of heat-labile nutrients. The slurry may be agitated and heated mildly to an appropriate temperature and pH may be adjusted to enhance enzyme activity. When predigestion has proceeded to a desired state, which may be characterized by partial or complete conversion of all the enzyme substrate in the comminuted seed material, the slurry preferably is dewatered and then dried, preferably by a known low-temperature technique such as flash evaporation or lyophilization. The dried material composition preferably is comminuted to a powder and may be mixed subsequently with enzymes or other materials or compounds to improve, for example, appearance, palatability, shelf life, or nutritive potential.

The seed food composition of the invention which has been enzymatically predigested is more readily digestible by humans than is the seed starting material and hence is more nutritious. In either the dried or slurry form, a predigested seed food composition in accordance with the invention may be incorporated as a high-nutrition component in a wide range of edible end products which are readily digestible and absorbable in the digestive tracts of humans, such as milkshakes or other drinks, baked goods including breads, cereals, cookies, food bars, and the like, as well as in animal food supplements such as dog and cat foods. The dried, powdered form may be used as a flour substitute or extender in many recipes.

The foregoing and other objects, features, and advantages of the invention, as well as presently preferred embodiments thereof, will become more apparent from a reading of the following description in connection with the accompanying drawing.

BRIEF DESCRIPTION OF THE DRAWINGS

Referring to FIG. 1, there is shown a reaction vessel 10 provided with a heating or cooling jacket 12 and a mixer drive 14, shaft 16, and impeller 18. These process components are only illustrative and not limiting. For example, vessel 10 may be open or closed and may be provided with an inert atmosphere such as nitrogen or helium as desired; agitation may be provided by a mixer internal to the vessel, or the vessel may be shaken, rotated, or tumbled; and the contents of the vessel may be heated or cooled in any known fashion, all as required for the reaction to proceed in the manner and rate required. Vessel 10 may also be provided with a pH control system 20 to control the contents of the vessel at any desired pH value.

Figure 1:
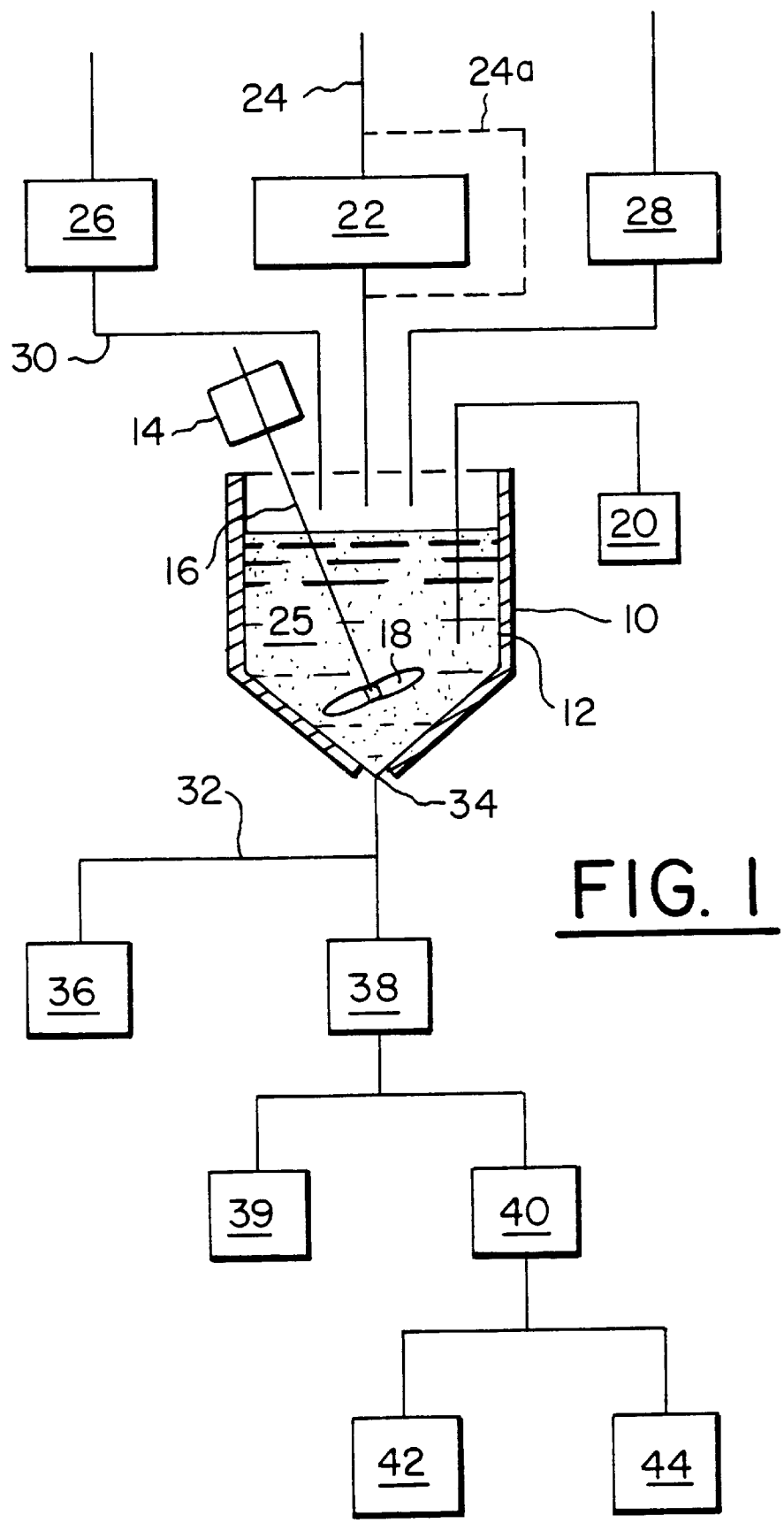
FIG. 1 is a schematic diagram of a process for making a predigested seed food composition in accordance with the invention.

A grinder or pulverizer 22 is disposed in a conveyance path 24 for seed substrate to be charged to vessel 10. When seed substrate is usable as received at the reaction vessel without further comminution, grinder 22 may be bypassed via path 24a. An enzyme dispenser 26, preferably a gravimetric dispenser, is provided whereby predetermined amounts of enzyme material may be added to vessel 10 as required, and a metered water dispensing system 28 is also provided whereby predetermined amounts of water may be added thereto. The enzyme material typically is presented as either a dried powder or as a stabilized solution or suspension in water.

In operation, a predetermined amount of seed material including seeds from one or a plurality of plant species is passed through grinder 22, wherein it is ground, mashed, pulverized, shredded, or otherwise comminuted to provide increased surface area for enzymatic digestion, and is then discharged into vessel 10. The seed material may be substantially dried before being comminuted. A predetermined amount of water is dispensed through system 28 into vessel 10. The water may be added to the vessel before or after the seed material as desired for any particular application. The water may be tempered to a desired temperature prior to addition, or preferably the batch may be tempered within the vessel by adjustment of temperature in jacket 12. Preferably, the mixer is set to run at a moderate speed to produce a slurry 25 having rolling agitation without significant entrainment of air. Preferably, the pH of the slurry is adjusted to a level which is predetermined to be optimum for the enzymatic reaction to be carried out.

The maceration of the seed material can serve to release native enzymes within the seeds, and soaking of the ground seed material in water with its released enzymes may prove sufficient in some instances to predigest the seed material. Preferably, however, predetermined amounts of one or more exotic enzymes are added to the slurry 25 in vessel 10 via dispenser 26 and line 30. The exotic enzymes may be derived from algal, bacterial, fungal, plant, or animal sources and may include, but are not limited to, proteases, lipases, amylases, invertases, diastases, cellulases, and pectinases. The batch is agitated for a predetermined length of time at controlled temperature and pH such that a desired percentage, typically about 100%, of the enzyme substrate in the seed material is enzymatically converted into less complex compounds, many of which are highly nutritious to humans and are readily absorbable by the human gastrointestinal tract. The resulting slurry 25 contains a predigested seed food composition in accordance with the invention.

Predigested seed food compositions may be recovered from vessel 10 in a number of forms. If the fully liquid form is desired, it can be transferred via line 32 from the outlet 34 of vessel 10 directly to an appropriate vessel 36. Alternatively, the slurry can be dewatered at dewatering module 38 which may include one or a combination of known processes such as filtration, pressing, centrifugation, vortex separation, membrane separation, vacuum separation, cyclone separation, and the like. Depending upon the degree of dewatering, the seed food composition may be recovered as a wet cake at receiver 39 or may be subjected further to any of various known, preferably low-temperature, drying processes such as lyophilization (freeze drying), drum drying, air drying, flash drying, and spray drying at drying module 40 wherein drying is applied in such a manner as to preserve and maintain the nutritional compounds in the predigested seed food composition. The composition may be recovered from drying as a crumbly cake at receiver 42 and may have a water content of less than about 5% and preferably less than about 1%, or it may be further processed or preserved by milling techniques 44 to prepare a powder or by further cooling or freezing techniques (not shown) as may be necessary to maintain the target substrate compounds in an appropriate state for further compounding or incorporation into consumable items.

From the foregoing description it will be apparent that there has been provided a process for production of predigested seed food compositions wherein high temperatures are not required and heat-labile nutritive compounds are not destroyed or removed, and wherein seed materials are subjected to enzymatic attack to convert otherwise indigestible nutritive compounds to digestible compounds. Variations and modifications of the herein described process and compositions, in accordance with the invention, will undoubtedly suggest themselves to those skilled in this art. Accordingly, the foregoing description should be taken as illustrative and not in a limiting sense.

What is claimed is:

1. A seed food composition, comprising:

a) an amount of seed material;

b) enzymes added to said amount of seed material; and c) readily digestible compounds resulting from enzymatic conversion of less readily digestible compounds in said seed material, wherein said composition includes substantially all of said amount of seed material and wherein at least a portion of said enzymatic conversion has occurred prior to ingestion of said composition by a consumer.

2. A seed food composition in accordance with claim 1 wherein said seed material is selected from the group consisting of whole grains, whole nuts, whole flower seed, milled grains, roasted grains, shelled nuts, defatted nuts, shelled flower seeds, and processed seeds, including sprouted seeds.

3. A seed food composition in accordance with claim 1 containing seed material from a plurality of species of plants.

4. A seed food composition in accordance with claim 1 wherein enzymes capable of converting less digestible compounds in the seed are selected from the group consisting of proteases, lipases, amylases, invertases, diastases, cellulases, and pectinases.

5. A seed food composition in accordance with claim 1 wherein water is present at less than about 5 weight percent.

6. A food for human consumption containing a seed food composition in accordance with claim 1.

* * * * *